UNITED STATES PATENT OFFICE.

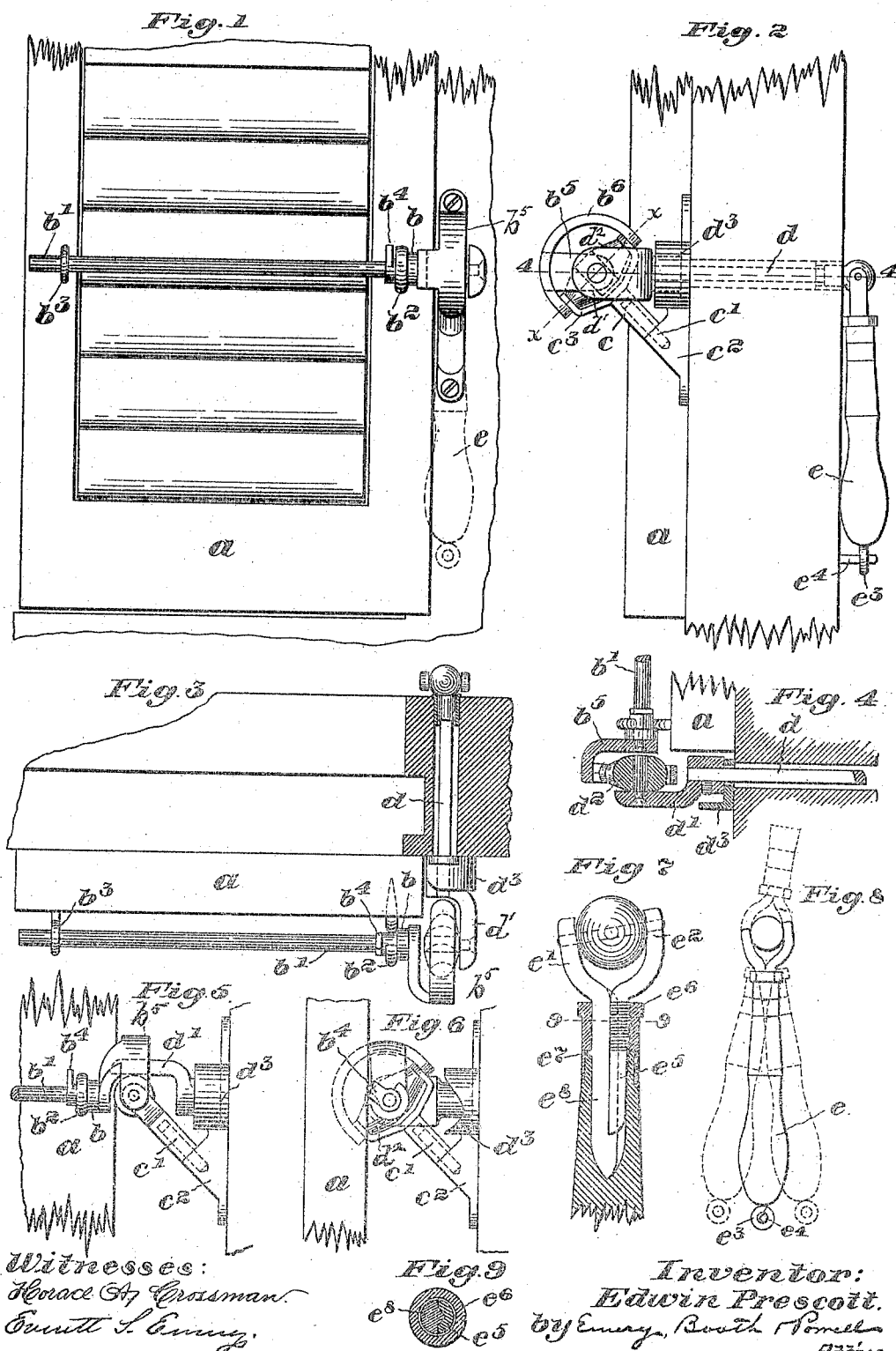

EDWIN PRESCOTT, OF ARLINGTON, MASSACHUSETTS.

MECHANISM FOR OPERATING SHUTTERS, &c.

No. 816,881.  Specification of Letters Patent.  Patented April 3, 1906.

Application filed November 10, 1904. Serial No. 232,149.

*To all whom it may concern:*

Be it known that I, EDWIN PRESCOTT, a citizen of the United States, and a resident of Arlington, county of Middlesex, and State of Massachusetts, have invented an Improvement in Mechanism for Operating Shutters and the Like, of which the following description, in connection with the accompanying drawings, is a specification, like letters on the drawings representing like parts.

My invention consists more particularly in improvements in that class of devices known as "shutter-operators," wherein an outside shutter is opened or closed from within a building without the necessity of lifting the window-sash, although it is to be understood that in many of its features my invention is not limited to the operation of shutters alone.

Shutter-operators of the type referred to are shown in prior patents granted to me, Nos. 308,698 and 328,141. In this connection, however, I have devised novel forms of jointed connections which may be employed for other operating mechanisms than those used for opening or closing shutters.

My invention will be best understood by reference to the following specification, when taken in connection with the accompanying drawings, showing one selected and illustrative embodiment thereof, while its scope will be more particularly pointed out in the appended claims.

In the drawings, Figure 1 is an elevation looking from without and showing the shutter with the shutter-operating parts in closed-shutter position. Fig. 2 is an end elevation of the shutter and shutter-operator as shown in Fig. 1. Fig. 3 is a plan of the closed shutter and shutter-operator shown in Fig. 1 with the window-casing shown partly in section. Fig. 4 is a section in plan taken on the line 4 4 in Fig. 2. Fig. 5 is an elevation showing the position of the parts composing the connecting-joint in a half-opened position of the shutter; Fig. 6, a like view of such parts in the full-open position of the shutter; Fig. 7, a detail of the drop-handle, partly in section, showing the adjustable ear; Fig. 8, a view of the drop-handle, showing the relation thereof to the fastening device; and Fig. 9 is a section on the line 9 9, Fig. 7.

My invention is illustrated as applied to an ordinary form of shutter $a$, swinging about a vertical axis. It will, however, be apparent that it is not limited in its application to any particular form or type of shutter and that the particular shutter here disclosed is shown only for illustrative purposes. The shutter is preferably attached to a swinging member $b$ by means of a bar or rod $b'$ of appropriate size, extending, preferably, across the face of the shutter. This bar, for reasons hereinafter referred to, is preferably of such size and material as to possess a measure of elasticity and provide yielding connection between the shutter and the swinging member. Such attachment may be easily made at the hinged stile of the shutter by means of the partly-open eye $b^2$, within which an enlarged portion of the rod when in position rests, and at the opposite side of the shutter from the hinge thereof by means of the closed eye $b^3$, through which the end of the rod $b'$ passes. Since the shutter-operator, as will more fully appear, itself affords a supporting hinge connection for the shutter and replaces one of the ordinary hinges, the operating device being located near the bottom of the illustrated shutter, a single upper hinge (not shown) only is here required. It therefore follows that when it is desired to remove the shutter from its fastening it may be tipped sidewise about the upper hinge far enough to withdraw the tip of the rod $b'$ from the eye $b^3$, whereupon it may be disconnected from the rod by permitting the latter to pass, when the blind is substantially half open, through the open portion of the eye $b^2$, (best shown in Figs. 3 and 4,) thereby permitting withdrawal of the shutter from the upper hinge. In order to prevent the removal of the shutter in either its open or closed positions, and particularly in the latter, I have provided a stop $b^4$ upon the rod $b'$, which turns with the rod as the shutter is opened or closed and registers with the opening in the eye $b^2$, only at some intermediate position, here about the half-open position, the rod $b$, eyes $b^2$ and $b^3$, and stop $b^4$ therefor constituting connections which permit the connection of the shutter with and its disconnection from the swinging arm at a position intermediate the full-open or closed positions of the shutter only. This also prevents the wind from working the shutter loose when the latter is fastened in either the open or closed position.

The swinging member $b$ is secured, by means of the elbow $b^5$, to the forked ears $b^6$ in such a manner as to permit the arm to swing freely without interference with any of the remaining connecting parts. Inclined to the plane of swinging movement of the swinging member $b$ is the short rotatable shaft $c$, journaled to turn about a stationary pin $c'$, suitably secured to a fixed part of the building, as by the casting $c^2$, attached to the exterior face of the window-casing. The angle of inclination of the rotatable shaft $c$ may be varied widely, but it is preferable to adopt substantially what is here shown—namely, an inclination of about forty-five degrees.

The rotatable member $c$ and the swinging member $b$ are pivotally connected together by appropriate pivotal connections between the forked ears $b^6$ and like ears $c^3$, attached to and turning with the shaft $c$. When the swinging member $b$ is attached to the shutter through the rod $b'$, on account of the connections afforded by the said rod the eyes $b^3$ and $b^4$ and the hinged attachment of the shutter it is constrained to swing with the shutter while turning on its axis, and rotation of the inclined shaft $c$, followed, as it is, by rotation of the pivotal connecting-axis (indicated by $x$ $x$) in a plane at right angles to the axis of shaft $c$, forces a partly-swinging and partly-rotative movement of the member $b$ and the rod $b'$ from the position shown in Figs. 1, 2, and 3 to the half-open position shown in Fig. 5, and finally to the full-open position shown in Fig. 6, if the full-opening movement of the shutter be completed. The member $c$ therefore acts as a directing member directing the movement of the swinging member.

Any means for turning the shaft $c$, and thus for operating the shutter, may be employed;
but I prefer to use the simple operative means herein shown, which consists of the turning shaft $d$, having a suitable interiorly-connected operating-handle $e$ and universally jointed to the shaft $c$ by means of the exteriorly-connected ear $d'$, pivotally secured at or about the center of a revoluble center piece or sleeve $d^2$, the latter being connected to turn about the pivotal axis $x$ $x$ of the latter. This connection constituting, as it does, a universal joint any movement of the handle $e$ turning the shaft $d$ will also turn the shaft $c$ and cause a resultant opening or closing movement of the shutter. The inclined shaft $c$ could be passed to and within the building and operated itself directly from within, but by locating it without and employing the horizontal operating-shaft $d$, I avoid the awkward operation of cutting an inclined hole through the casing and provide a much more conveniently located and efficient operating member. From the described mode of operation of this connecting-joint it will be seen that when the operating-shaft $d$ is turned the shaft $c$ acts as a directing member to enforce the partly-swinging and partly-rotative movement of the member $b$.

It will be observed that the connection of the rotatable shaft $c$ to the casting $c^2$ provides a stout supporting hinging connection for the shutter at that point, the latter being obliged to turn about a vertical axis passing through the center of the jointed connection.

The shaft $c$ might be inclined upwardly and away from the plane of swinging movement, if desired; but the downward inclination adopted in the illustrated form of my invention causes a lifting effect to be exerted upon the shutter as soon as the swinging movement is obstructed by the shutter reaching the open or closed position. The object of this will appear.

The operating-handle $e$ is preferably of the general type shown in my prior patent, No. 328,141, being pivotally attached to the end of the operating-shaft $d$ by means of the ear connections $e'$ and $e^2$, so that it may be swung into an upright or depending or any other intermediate position. The bottom of the handle is provided with an eye $e^3$, which is adapted to be secured to suitable fastening means on the window-casing (herein the pin $e^4$) over the end of which the eye may be snapped when the handle has been moved far enough.

When the shutter comes against its seat upon the window-casing in the closing movement thereof or after it has reached its appropriate stop (not shown) in the opening movement thereof, there will still be considerable looseness in the connections, and as in my prior patent I have shown one of the connecting-ears—namely, $e^2$—longer than the other ear $e'$, so that the handle in its depending position will fall short of the fastening-pin $e^4$ when either the opening or closing position of the shutter has been completed, thus requiring a certain supplemental movement of the handle to secure its fastening. In the embodiment of my invention here disclosed this not only, as before, takes up any looseness in the joints of the operating parts, but also forces the shutter to a firm seat through the elastic rod $b'$, which to this end is purposely made to constitute a yieldable connection between the shutter and the operating device. This supplemental movement at the same time also slightly lifts the shutter, as above pointed out, relieving or partly relieving the hinges of the shutter-weight, thus not only forcing it inward to a seat, but also upward through the yieldable connection and rendering any looseness wholly ineffectual to cause rattling or sagging. Thus if the shutter is open the handle is loosened from the full-line position, (shown in Fig. 8,) thrown upwardly to the elevated position shown in dotted lines, and swung left-handedly to close the shutter until it reaches the depending left-hand position corresponding to the closed position of the shutter. The handle is then moved toward the pin and forced over it, which supplemental movement effectively seats the shutter through the yielding connection, as described.

It frequently happens that it is desirable to vary the supplemental movement necessary to seat the shutter, and for this purpose I have made the ear $e^2$ adjustable to vary its length. The shank $e^5$ of the ear $e^2$ is slidably seated within the handle $e$ (see Fig. 9) and has an outer threaded portion thereof engaging the nut $e^6$, which latter bears against a shoulder $e^7$ upon the shank $e^8$ of the stationary ear $e'$. Turning the nut $e^6$ varies the length of the ear $e^2$ and the deviation, therefore, of the handle $e'$ from the fastening-pin when dropped to a depending position. The adjustment of the ear $e^2$ is also advantageous in applying the operating device to shutters which are deprived of a full swing, such as one placed near the corner of two right-angled walls and confined thereby, for example, to a movement of ninety degrees. Under such conditions the ear $e^2$ may be lengthened until the elevated and depressed positions of the handle are somewhat more than ninety degrees apart. If the squared portion of the shaft $d$ is loosened in the connection $d'$ and replaced in a reversed position and the shaft then twisted slightly in a vise, the handle may be made to assume depressed positions relatively to the fastening-pin corresponding to the open and closed shutter positions like those shown in Fig. 8, the shutter, however, having an opening movement of ninety degrees only. Similar adjustments to a different extent may be used to apply the device to shutters where greater or less opening movement is required, leaving the handle, however, in such a position that it will effectually lock and seat the shutter both in its open, as well as its closed position.

The casting $c^2$ is provided with a protecting-flange $d^3$, which denies access to the connecting-screw between the joint $d'$ and the shaft $d$ when the shutter is closed. When the shutter is open, such screw may be easily reached with a screw-driver. When the shutter is closed, there is no means for loosening or removing any of the connections from the outside, thus rendering it proof against outside tampering.

The connecting-joint for the operating mechanism disclosed is strong, simple, and efficient, particularly when applied to the operation of the shutter. It will be obvious that it may be applied to any like purpose where it is desired to effect a swinging movement from a rotary movement, or vice versa.

While the drop-handle described provides a convenient method of moving my shutter-operator, it is obvious that there are many equivalents, such as a crank or a knob or the like, which fall within the scope of my invention.

It will be understood that my invention is not limited to the precise details or arrangements of parts which are herein disclosed, but that the same is capable of extensive modifications without departing from the spirit thereof and that other applications of the invention may be made than that described—such, by way of illustration, as the operation of transoms, skylights, and hinged or pivoted closures and other members of various kinds.

I claim—

1. An operating device for operating shutters or the like having a swinging and rotating member adapted for connection to the shutter, a rotatable member connected to said swinging member and inclined to the plane of movement thereof, an operating member also inclined to said rotatable member and a connection between said operating member and rotatable member for the turning thereof, the turning of said rotatable member acting both to swing said swinging member and also turn the same upon its axis.

2. A shutter-operator having an operating device a multipart connecting-joint, one part being supported for turning movement to a fixed part of the building, a second part connected to the shutter and pivoted to said first part for swinging movement, a third part for swinging said first part and a connection between said third part and said operating means.

3. A shutter-operator having operating means, a member connected to a fixed part of the building, a member secured to the shutter and pivotally connected to said first member for swinging movement about the same, the axes of said two members being inclined one to another, means for turning said first member to cause said shutter member to swing said shutter and a connection between said turning means and said operating means.

4. A jointed connection for operating shutters or the like comprising a swinging member constrained to move in a given direction, a rotatable member connected in fixed pivotal relation thereto and an operating member universally jointed to said rotatable member for causing the turning thereof.

5. A jointed connection for operating shutters or the like having a member rotatable about a fixed axis, a second member secured in fixed pivotal relation thereto and constrained to swing in a given direction on rotation of said first member, and a third member having connections adapted to rotate the same simultaneously with the rotation and swinging respectively of said first and second members.

6. In an operating device for operating shutters or the like, a rotatable member, a second rotatable member secured in fixed pivotal relation thereto connections constraining the same to swing in a given direction on rotation of said first member and also to turn therewith, and means for rotating said second member.

7. The combination with a shutter having a stile hinged to a building, of an operating member, a swinging member moved thereby, means for moving said swinging member to swing and simultaneously lift the shutter, connections between said lifting means and said operating means and an elastic bar connecting said swinging member to the shutter at a point other than and beyond the hinged stile.

8. The combination with a shutter having a stile hinged to a building, of operating means for opening and closing the shutter from within said building, means for lifting the same simultaneously with the movement of the operating means near the final movement thereof, connections between said operating means and said lifting means and a yieldable connection between said operating means and said shutter at a point other than and beyond the hinged stile.

9. The combination with a shutter having a stile hinged to a building, of operating means for opening and closing the shutter from within the building, a swinging member moved thereby, means for lifting said swinging member simultaneously with the movement thereof, connections between said operating means and said lifting means and swinging member and means connecting said swinging member to said shutter at a point other than the hinged stile thereof.

10. In a mechanism for operating shutters or the like, the combination with operating means for opening and closing the shutter, a swinging arm moved by said operating means and connected with the shutter, and connections between said arm and shutter permitting the connection of the latter with or its disconnection from said swinging arm at a position intermediate the full-open or closed positions of the shutter only.

11. In a mechanism for operating shutters or the like, the combination with an operating-shaft of a pivoted drop-handle having ears of unequal length, fastening means therefor, and means associated with the handle for varying the inequality in the relative lengths of said ears.

12. A shutter-operator having a swinging member for connection to the shutter a rotatable member having a fixed axis and inclined downwardly and away from the plane of swinging movement and connections between said rotatable member and said swinging member.

13. A jointed connection for operating shutters or the like comprising a center piece and three members pivotally connected thereto, said members being each partially rotatable and one having in addition a swinging movement about said center piece.

14. A shutter-operating device comprising a rotating and swinging member for attachment to the shutter, an operating member for moving said swinging member operating means for moving said operating member, and a directing member connected with the swinging member and the operating member.

15. A shutter-operator having a rotating and swinging member for attachment to the shutter and a turning directing member pivotally secured thereto, having its axis inclined to the axis of the first member.

16. The combination with a shutter, of an operating device therefor comprising a rotatable member, a second member secured in fixed pivotal relation thereto, connections constraining said second member to swing in a given direction on rotation of said first member, and a third member lying in a plane substantially at right angles to the pivotal axis of the shutter for rotating said second member, and connections between said second member and said rotating means.

In testimony whereof I have signed my name to this specification in the presence of two subscribing witnesses.

EDWIN PRESCOTT.

Witnesses:
THOMAS B. BOOTH,
ALICE RICHMOND BROWN.